(12) United States Patent
Nakano

(10) Patent No.: US 11,535,126 B2
(45) Date of Patent: Dec. 27, 2022

(54) VEHICLE SEAT PASSENGER PROTECTION STRUCTURE

(71) Applicant: TOYOTA JIDOSHA KABUSHIKI KAISHA, Aichi-ken (JP)

(72) Inventor: Shiro Nakano, Miyoshi (JP)

(73) Assignee: TOYOTA JIDOSHA KABUSHIKI KAISHA, Aichi-Ken (JP)

(*) Notice: Subject to any disclaimer, the term of this patent is extended or adjusted under 35 U.S.C. 154(b) by 219 days.

(21) Appl. No.: 16/746,964

(22) Filed: Jan. 20, 2020

(65) Prior Publication Data

US 2020/0254908 A1 Aug. 13, 2020

(30) Foreign Application Priority Data

Feb. 12, 2019 (JP) .............................. JP2019-022998

(51) Int. Cl.
*B60N 2/08* (2006.01)
*B60N 2/07* (2006.01)

(52) U.S. Cl.
CPC .......... *B60N 2/0806* (2013.01); *B60N 2/0705* (2013.01); *B60N 2/0715* (2013.01)

(58) Field of Classification Search
CPC .. B60N 2/0806; B60N 2/0705; B60N 2/0715; B60N 2/073; B60N 2/0727; B60N 2/08; B60N 2/4249; B60N 2/0725
See application file for complete search history.

(56) References Cited

U.S. PATENT DOCUMENTS

2011/0133529 A1 6/2011 Guerrero
2018/0292821 A1 10/2018 Minato et al.

FOREIGN PATENT DOCUMENTS

| CN | 208006767 U | 10/2018 | |
|---|---|---|---|
| DE | 102014108226 A1 * | 12/2015 | ........... B60N 2/0705 |
| JP | 2003-104150 A | 4/2003 | |
| JP | 2003-118442 A | 4/2003 | |
| JP | 2011-136685 A | 7/2011 | |
| JP | 2018-79850 A | 5/2018 | |
| JP | 2018-176902 A | 11/2018 | |
| KR | 20110110399 A * | 10/2011 | |

* cited by examiner

*Primary Examiner* — Kimberly T Wood
(74) *Attorney, Agent, or Firm* — Hauptman Ham, LLP

(57) ABSTRACT

There is provided a vehicle seat passenger protection structure, including: rail members that are fixed to a floor of a vehicle, and have, in lower surfaces thereof, slit portions that extend in the seat longitudinal direction; sliding members that are connected to a lower portion of a seat cushion, and are disposed at interiors of the rail members, and are supported so as to be slidable in the seat longitudinal direction by the rail members; and upward movement suppressing members that include main body portions, which are disposed so as to face lower surfaces of the rail members, and fixing portions, which project out toward a seat upper side from the main body portions and pass through the slit portions and are fixed to lower surfaces of the sliding members, and that can move in the seat longitudinal direction following the sliding members.

7 Claims, 13 Drawing Sheets

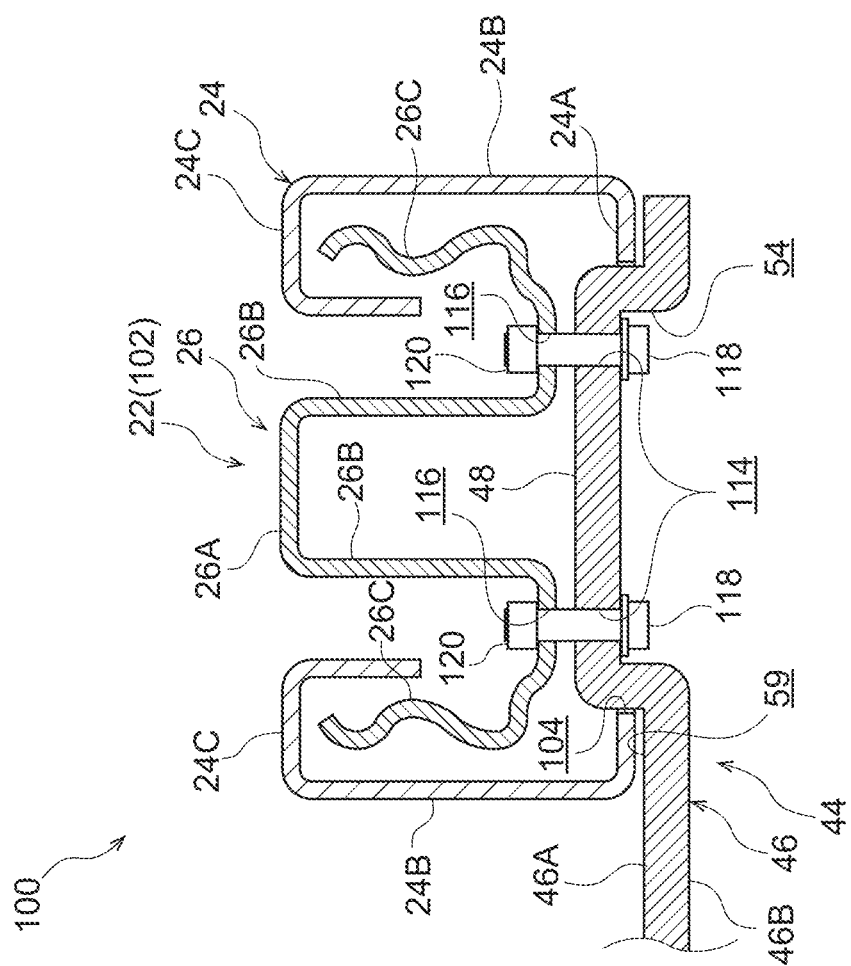

VEHICLE SEAT PASSENGER PROTECTION STRUCTURE

CROSS-REFERENCE TO RELATED APPLICATION

This application is based on and claims priority under 35 USC 119 from Japanese Patent Application No. 2019-022998 filed on Feb. 12, 2019, the disclosure of which is incorporated by reference herein.

BACKGROUND

Technical Field

The present disclosure relates to a vehicle seat passenger protection structure.

Related Art

Japanese Patent Application Laid-Open (JP-A) No. 2018-079850 discloses a structure of a vehicle seat that is provided with a seat sliding device in which sliding members (upper rails), which are fixed to the lower portion of a seat cushion (a seat), can slide with respect to rail members (lower rails) that are fixed to the floor of the vehicle.

In the technique disclosed in aforementioned JP-A No. 2018-079850, when load in the seat upward direction is inputted to the seat at the time of a collision of the vehicle, the sliding members that are engaged with the rail members are pulled toward the seat upper side.

Therefore, in a case in which the input load at the time of a collision is large, there is the concern that the sliding members will become dislocated from the rail members, and it will not be possible to maintain the position of the seat. There is room for improvement with regard to this point.

SUMMARY

In view of the above-described circumstances, the present disclosure is to provide a vehicle seat passenger protection structure that can suppress displacement of a seat at the time of a vehicle collision, and can improve the passenger protecting performance of the vehicle seat.

A vehicle seat passenger protection structure relating to a first aspect of the present disclosure includes: rail members that are fixed to a floor of a vehicle, that extend in a seat longitudinal direction, that are formed in an open cross-sectional shape opening toward a seat upper side as seen in a vertical sectional view, and that have, in lower surfaces at which a slit portion extends in the seat longitudinal direction; sliding members that are connected to a lower portion of a seat cushion, that are disposed at interiors of the rail members, and that are supported by the rail members so as to be slidable in the seat longitudinal direction; and upward movement suppression members that include main body portions, which are disposed so as to face lower surfaces of the rail members, and include fixing portions, which protrude toward a seat upper side from the main body portions pass through the slit portions and are fixed to lower surfaces of the sliding members, the upward movement suppression members being movable in the seat longitudinal direction following the sliding members.

In the vehicle seat passenger protection structure relating to the first aspect of the present disclosure, because the sliding members that are connected to the seat cushion are slid with respect to the rail members, the vehicle seat is slid in the seat longitudinal direction with respect to the vehicle floor. Further, the upward movement suppressing members are disposed at the lower sides of the rail members. The fixing portions of the upward movement suppressing members pass through the slits that are formed in the lower surfaces of the rail members, and are fixed to the lower surfaces of the sliding members. Due thereto, when the sliding members slide with respect to the rail members, the upward movement suppressing members move in the seat longitudinal direction following the sliding members.

By the way, when load in seat upward direction is inputted to the vehicle seat at the time of a collision of the vehicle, the sliding members that are connected to the seat cushion, and the upward movement suppressing members that are fixed to the lower surfaces of the sliding members, are pulled toward the seat upper side. At this time, the main body portions of the upward movement suppressing members abut and anchor on the lower surfaces of the rail members, and therefore, movement of the sliding members toward the seat upper side is restricted. As a result, it is difficult for the sliding members to become dislocated from the rail members, and upward displacement of the vehicle seat that accompanies a collision is suppressed effectively.

In a vehicle seat passenger protection structure relating to a second aspect of the present disclosure, in the structure of the first aspect, the upward movement suppression members are configured such that gaps are formed between the main body portions and the lower surfaces of the rail members, due to the fixing portions serving as spacers.

In the vehicle seat passenger protection structure relating to the second aspect of the present disclosure, the fixing portions are spacers, and gaps are formed between the main body portions and the lower surfaces of the rail members. Therefore, at usual times, when the vehicle seat is moved along the rail members, the generation of abnormal noise that accompanies movement of the upward movement suppressing members is suppressed. Further, the sliding members that are connected to the upward movement suppressing members can slide smoothly with respect to the rail members. Due thereto, the operability of the vehicle seat at usual times improves.

In a vehicle seat passenger protection structure relating to a third aspect of the present disclosure, in the structure of the first aspect or the second aspect, the rail members are respectively disposed at seat transverse direction outer sides of the seat cushion, and the upward movement suppression members, which are respectively disposed at seat lower sides of the rail members, are connected in a seat transverse direction by a cross member that extends in the seat transverse direction.

In the vehicle seat passenger protection structure relating to the third aspect of the present disclosure, a pair of the upward movement suppressing members that are disposed at the seat transverse direction outer sides are connected in the seat transverse direction by the cross member that extends in the seat transverse direction. Therefore, at the time of a collision of the vehicle, load that is inputted to the vehicle seat is transmitted via the sliding members to the upward movement suppressing members, and is transmitted efficiently from the upward movement suppressing members via the cross member to the left and right rail members. As a result, at the time of a collision of the vehicle, the load that is applied to the vehicle seat is dispersed efficiently, and displacement of the vehicle seat is suppressed.

In a vehicle seat passenger protection structure relating to a fourth aspect of the present disclosure, in the structure of the third aspect, side surfaces at seat transverse direction inner sides of the rail members are located, in the seat transverse direction, between the cross member and fastening members that pass through the fixing portions in a seat vertical direction.

In the vehicle seat passenger protection structure relating to the fourth aspect of the present disclosure, the fastening members, which pass through the fixing portions in the seat vertical direction, and the cross member are disposed such that the side surfaces at the seat transverse direction inner sides of the rail members are located between the fastening members and the cross member. Therefore, in a case in which load in the seat transverse direction is inputted to the vehicle seat at the time of a collision of the vehicle, the side surfaces at the seat transverse direction inner sides of the rail members receive reaction force from the fastening members or the cross member, which are positioned at the left and right both sides, and are supported. Due thereto, deformation of the side surfaces that are at the seat transverse direction inner sides of rail members is suppressed, and it is even more difficult for the sliding members to become dislocated from the rail members.

In a vehicle seat passenger protection structure relating to a fifth aspect of the present disclosure, in the structure of any one of the first aspect through the fourth aspect, locking mechanisms, which have lock pieces that can be displaced in a seat vertical direction, are provided at seat lower sides of the rail members, and, due to the sliding members being moved to predetermined positions with respect to the rail members, the lock pieces are moved toward a seat upper side are set in a locking state in which the lock pieces are engaged with lock holes formed in lower surfaces of the sliding members, and restrict movement of the sliding members in the seat longitudinal direction.

In the vehicle seat passenger protection structure relating to the fifth aspect of the present disclosure, due to the lock pieces of the locking mechanisms being engaged with the lock holes that are formed in the lower surfaces of the sliding members, the sliding members can be fixed at predetermined positions with respect to the rail members. Due thereto, when load in the seat longitudinal direction is inputted to the vehicle seat at the time of a vehicle collision, because the lock pieces abut and are anchored on the lock holes, movement of the sliding members in the seat longitudinal direction is restricted. As a result, displacement of the vehicle seat in the seat longitudinal direction that accompanies a collision is suppressed.

In a vehicle seat passenger protection structure relating to a sixth aspect of the present disclosure, in the structure of the fifth aspect, the sliding members are slidable in the seat longitudinal direction between forward positions at which the fixing portions of the upward movement suppression members are anchored to front ends of the slit portions, and rearward positions, at which the fixing portions of the upward movement suppression members are anchored to rear ends of the slit portions, and, due to the sliding members being moved to the forward positions or the rearward positions, the lock pieces of the locking mechanisms are set in the locking state.

In the vehicle seat passenger protection structure relating to the sixth aspect of the present disclosure, the sliding members can slide between forward positions and rearward positions. Further, in the state in which the sliding members are positioned at the forward positions or the rearward positions, the fixing portions of the upward movement suppressing members are anchored on the front ends or the rear ends of the slit portions of the rail members, and the lock pieces of the locking mechanisms are in locking states. Therefore, when load in the seat longitudinal direction is inputted to the vehicle seat at the time of a collision of the vehicle, the load can be dispersed to the rail members and the locking mechanisms via the upward movement suppressing members and the lock pieces. Thus, displacement of the vehicle seat in the seat longitudinal direction that accompanies a collision is suppressed effectively.

In a vehicle seat passenger protection structure relating to a seventh aspect of the present disclosure, in the structure of any one of the first aspect through the sixth aspect, the sliding members include lower rails and upper rails that are configured integrally, the rail members comprise outer rails that support the sliding members, which include the lower rails and the upper rails, such that the sliding members are slidable in the seat longitudinal direction, the lower rails extend in the seat longitudinal direction, are disposed at interiors of the outer rails, and are supported by the outer rails so as to be slidable in the seat longitudinal direction and the upper rails are disposed at seat upper sides of the lower rails, are connected to the lower portion of the seat cushion, and are supported by the lower rails so as to be slidable in the seat longitudinal direction.

The vehicle seat passenger protection structure relating to the seventh aspect of the present disclosure has the sliding members that include the lower rails and the upper rails. Therefore, the vehicle seat includes structures that can slide with respect to the rail members, and structures that can slide with respect to the lower rails of the sliding members. In other words, the vehicle seat is structured to included two sliding mechanisms. Due thereto, for example, there can be a structure in which the lower rails and the upper rails of a known seat position adjusting mechanism, which adjusts the seat position at the time of a driving posture, are made to be the sliding members, and the long sliding mechanism, whose seat movable range is larger than that of the sliding members, is structured by the rail members and the sliding members. As a result, the seat position adjusting mechanism and the long sliding mechanism are structured by separate driving mechanisms, and therefore, the large movement of the seat position that uses the long sliding mechanism can be completed rapidly.

Because the vehicle seat passenger protection structure of the first aspect of the present disclosure is structured as described above, there is the excellent effect that displacement of the seat at the time of a vehicle collision can be suppressed, and the passenger protecting performance of the vehicle seat can be improved.

Because the vehicle seat passenger protection structure of the second aspect of the present disclosure is structured as described above, there are the excellent effects that the operability of the vehicle seat at usual times can be improved, and the passenger protecting performance at the time of a vehicle collision can be improved.

Because the vehicle seat passenger protection structure of the third aspect of the present disclosure is structured as described above, there is the excellent effect that, at the time of a vehicle collision, the load that is applied to the vehicle seat can be dispersed efficiently, and displacement of the vehicle seat can be suppressed.

Because the vehicle seat passenger protection structure of the fourth aspect of the present disclosure is structured as described above, there is the excellent effect that displacement of the seat at the time of a vehicle collision can be suppressed, and the passenger protecting performance of the vehicle seat can be improved.

Because the vehicle seat passenger protection structure of the fifth aspect of the present disclosure is structured as described above, there is the excellent effect that displacement of the seat in the seat longitudinal direction at the time of a vehicle collision can be suppressed, and the passenger protecting performance of the vehicle seat can be improved.

Because the vehicle seat passenger protection structure of the sixth aspect of the present disclosure is structured as described above, there is the excellent effect that displacement of the seat in the seat longitudinal direction at the time of a vehicle collision can be suppressed effectively, and the passenger protecting performance of the vehicle seat can be improved more.

Because the vehicle seat passenger protection structure of the seventh aspect of the present disclosure is structured as described above, there is the excellent effect that the large movement of the seat position that uses the long sliding mechanism can be completed rapidly.

BRIEF DESCRIPTION OF THE DRAWINGS

Exemplary embodiments of the present disclosure will be described in detail based on the following figures, wherein:

FIG. 13 is an enlarged sectional view that corresponds to FIG. 12 and shows a modified example of the second embodiment.

DETAILED DESCRIPTION

First Embodiment

Figure 1:
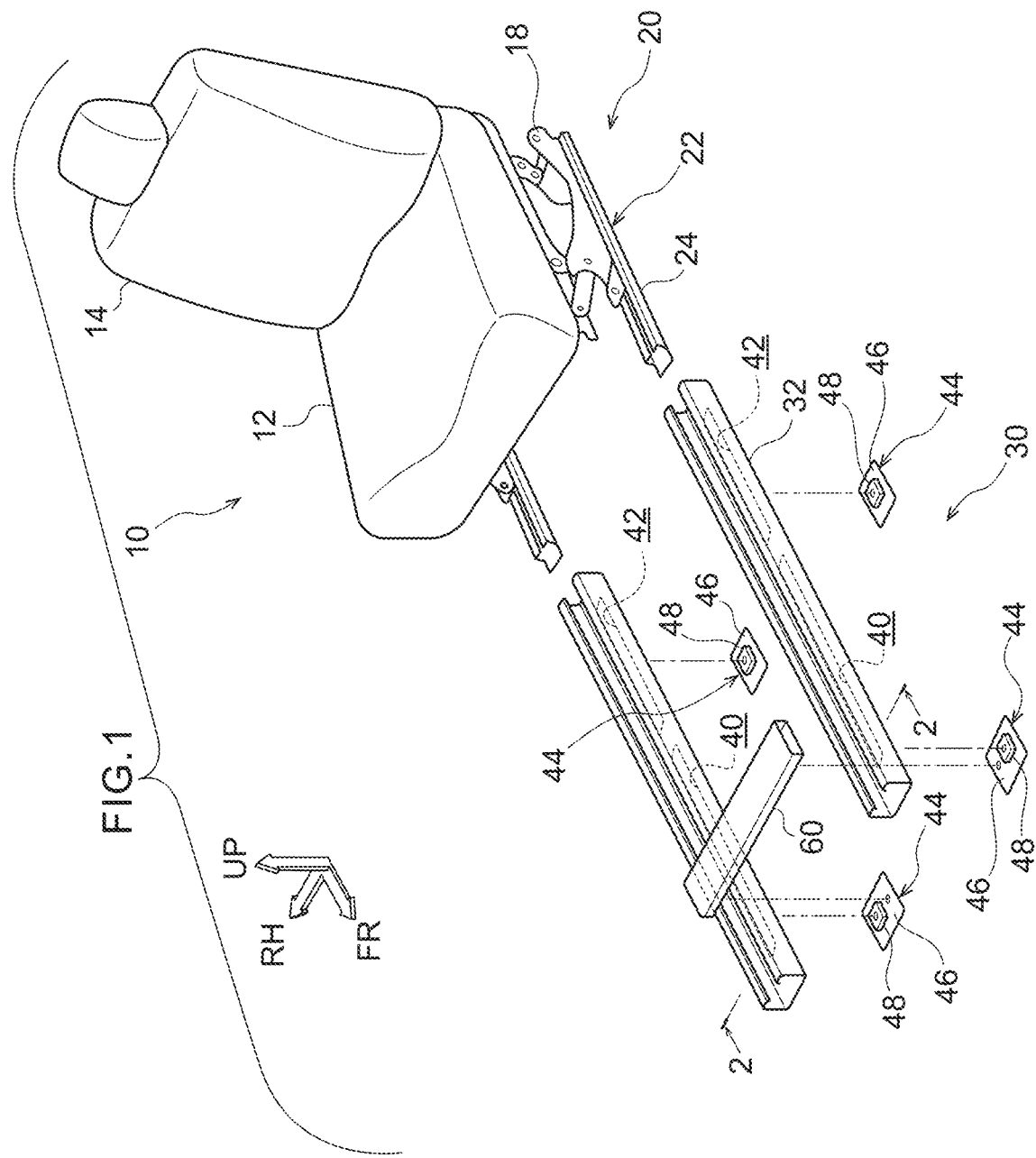
FIG. 1 is a perspective view of a vehicle seat to which a vehicle seat passenger protection structure relating to a first embodiment is applied.

A vehicle seat 10, to which is applied a vehicle seat passenger protection structure relating to a first embodiment, is described hereinafter by using FIG. 1 through FIG. 11. Note that there are cases in which some reference numerals are omitted in the drawings in order to make the drawings easy to understand. Further, arrow FR that is shown appropriately in the respective drawings indicates the vehicle front side, arrow UP indicates the vehicle upper side, and arrow RH indicates the vehicle right side. Further, when longitudinal, vertical and left-right directions are used in the following description without being specified, they refer to the longitudinal of the vehicle longitudinal direction, the vertical of the vehicle vertical direction, and the left and the right when facing in the advancing direction.

As shown in FIG. 1, the vehicle seat 10 is structured to include a seat cushion 12 that structures the seating portion of the vehicle seat 10, and a seatback 14 is that is tiltably connected to the rear end portion of the seat cushion 12 and structures the seatback portion of the vehicle seat 10. As an example, the vehicle seat 10 is a front passenger's seat. The vehicle seat 10 is, at the lower side of the seat cushion 12, connected to a floor 16 (see FIG. 6 and FIG. 9) of the vehicle via a seat position adjusting mechanism 20 and a long sliding mechanism 30. Note that locking mechanisms 70 and a slide regulator module 86 are not illustrated in FIG. 1.

(Seat Cushion 12)

The seat cushion 12 has an unillustrated cushion frame that structures the frame (the frame member) of the seat cushion 12. As an example, the cushion frame is formed substantially in the shape of a rectangular frame as seen in a plan view, and has an unillustrated pair of left and right side frames at the seat transverse direction both sides. The lower end portions of the left and right side frames are connected to a pair of upper rails 26, which are described later, via a known lifter mechanism 18.

(Seat Position Adjusting Mechanism 20)

Figure 3:
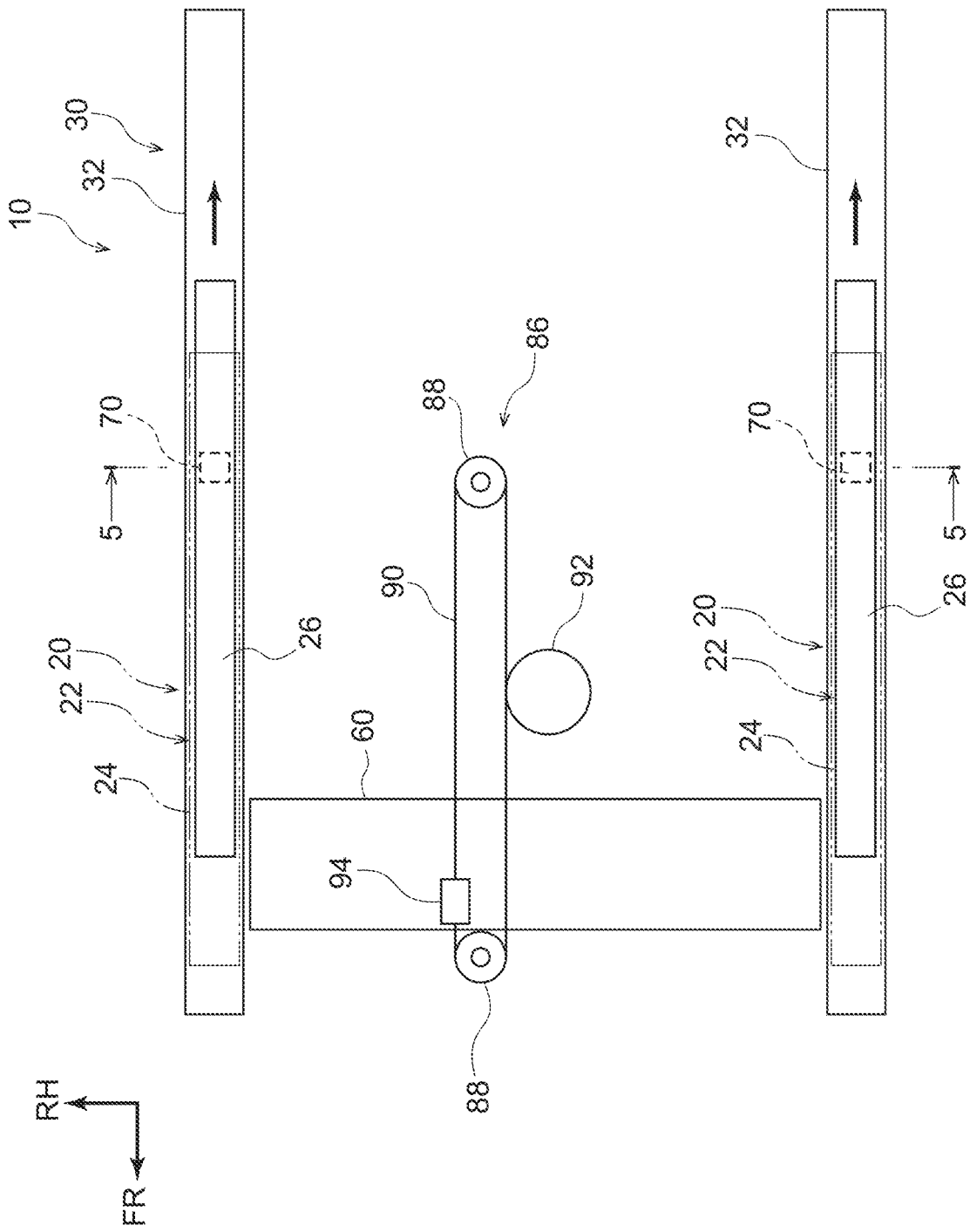
FIG. 3 is a drawing that schematically shows main portions of the first embodiment, and is a plan view showing a state in which slide rails are positioned at forward positions.
Figure 4:
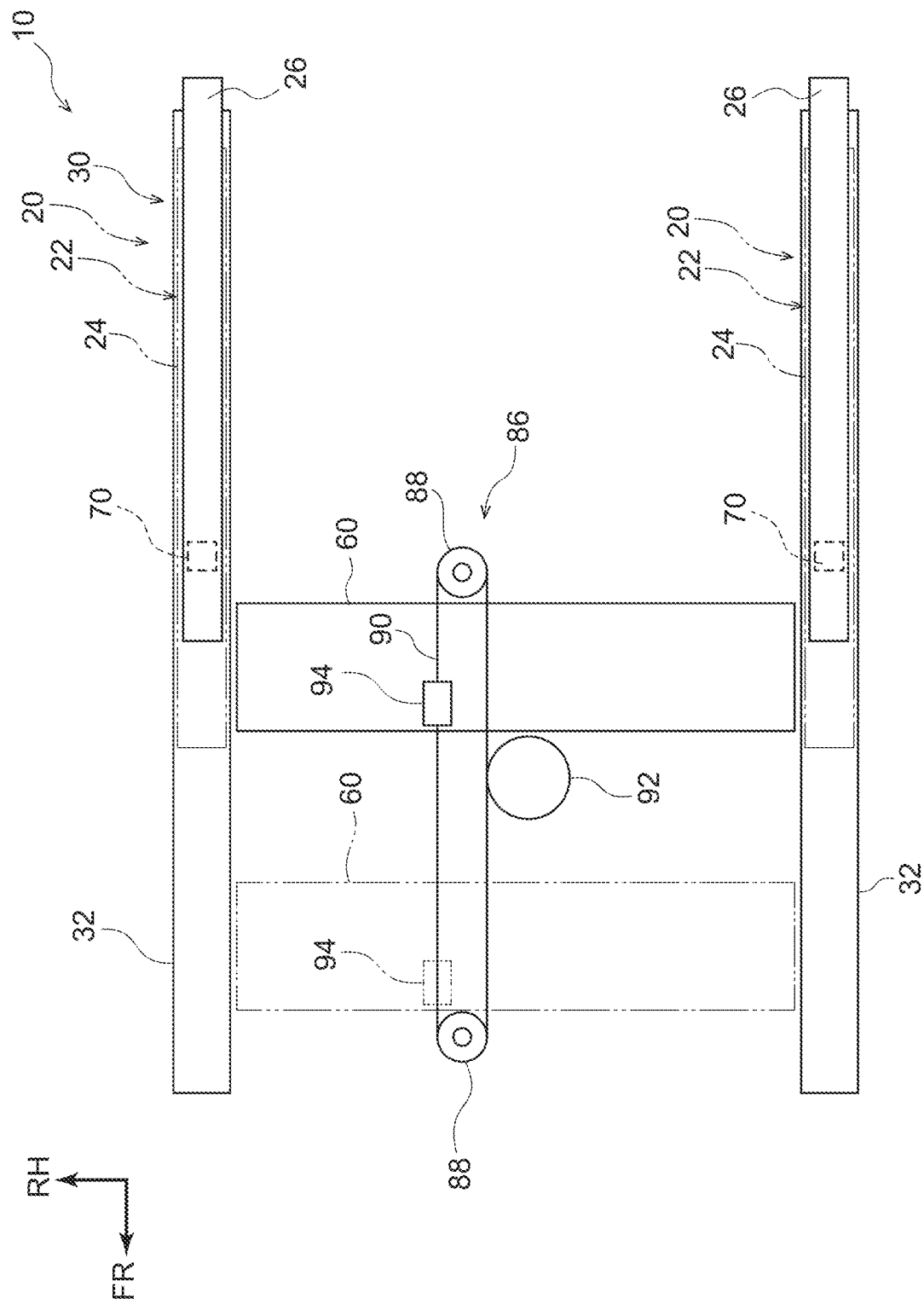
FIG. 4 is a drawing that schematically shows main portions of the first embodiment, and is a plan view showing a state in which the slide rails are positioned at rearward positions.

As shown in FIG. 1, FIG. 3 and FIG. 4, the seat position adjusting mechanism 20 has a pair of left and right slide rails 22. The left and right slide rails 22 are formed in substantially elongated shapes whose length directions are the seat longitudinal direction, and are disposed so as to be lined up in the seat transverse direction. These slide rails 22 are structured to include lower rails 24 and the upper rails 26.

Figure 2:
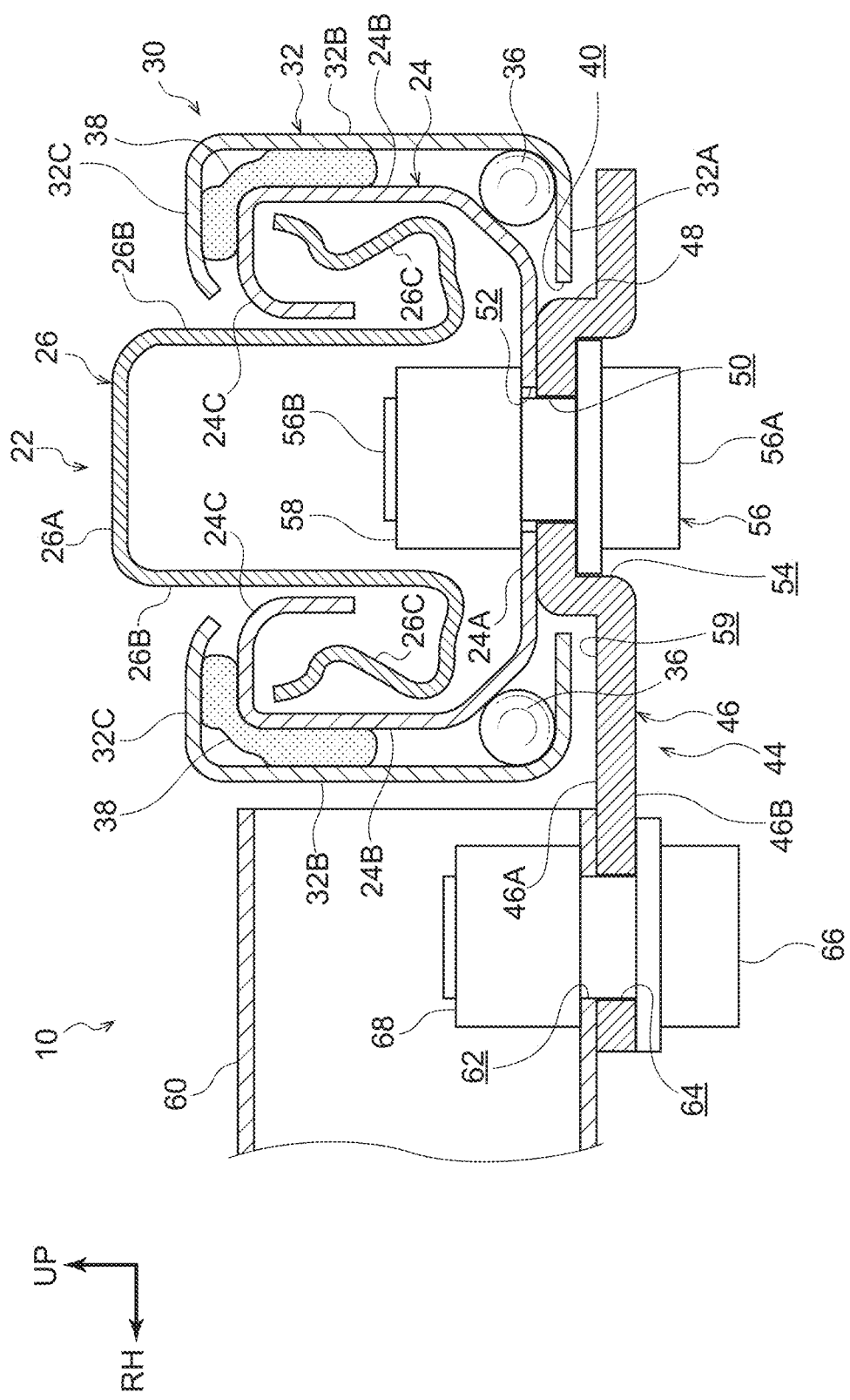
FIG. 2 is an enlarged sectional view showing the cross-section that is cut along line 2-2 of FIG. 1.

The front end portion of the slide rail 22 is shown in a vertical sectional view in FIG. 2. As shown in this drawing, the lower rail 24 has a substantially C-shaped open cross-section that opens toward the seat upper side, and is formed by a lower surface portion 24A, which extends substantially horizontally as seen in a vertical sectional view, and side wall portions 24B that extend toward the seat upper side from the seat transverse direction both end portions of the lower surface portion 24A. Further, the lower rail 24 has upper flange portions 24C that are bent at right angles toward the inner side of the open cross-section from the upper end portions of the side wall portions 24B, and that are folded over in substantially upside-down L-shapes and extend toward the lower side.

The upper rail 26 has a substantially C-shaped open cross-section that opens toward the seat lower side, and is formed by an upper surface portion 26A, which extends substantially horizontally as seen in a vertical sectional view, and vertical wall portions 26B that extend toward the seat lower side from the seat transverse direction both end portions of the upper surface portion 26A. Further, the upper rail 26 has folded-over portions 26C that are folded-over toward the outer sides of the open cross-section from the lower end portions of the vertical wall portions 26B and that extend toward the upper side. The upper rail 26 is disposed at the inner side of the pair of side wall portions 24B of the lower rail 24. The folded-over portions 26C of the upper rail 26 are inserted between and engaged with the side wall portions 24B and the upper flange portions 24C of the lower rail 24. In this state, the upper rail 26 is supported so as to be slidable with respect to the lower rail 24.

Note that the seat position adjusting mechanism 20 is structured such that the upper rails 26 are slid in the seat longitudinal direction with respect to the lower rails 24 by the driving force of an unillustrated motor for sliding. Note that the slide rails 22 that are structured by the upper rails 26 and the lower rails 24 correspond to the "sliding members" in the present disclosure.

(Long Sliding Mechanism 30)

As shown in FIG. 1 through FIG. 5, the long sliding mechanism 30 is structured to include a pair of left and right outer rails 32, and is a mechanism that supports the above-described slide rails 22 slidably with respect to the outer rails 32. Further, the long sliding mechanism 30 is structured to include upward movement suppressing members 44 that restrict movement of the lower rails 24 toward the seat upper side, the locking mechanisms 70 that fix the lower rails 24 at predetermined positions with respect to the outer rails 32, and the slide regulator module 86 that imparts driving force to the lower rails 24. Note that the upward movement suppressing members 44 are not illustrated in FIG. 3 and FIG. 4.

(Outer Rails 32)

As shown in FIG. 2, the pair of outer rails 32 are formed in substantially elongated shapes whose length directions are the seat longitudinal direction, and are disposed so as to be lined up in the seat transverse direction in correspondence with the slide rails 22 of the seat position adjusting mechanism 20. Each of the outer rails 32 has a substantially C-shaped open cross-section that opens toward the seat upper side, and is formed by a lower surface portion 32A, which extends substantially horizontally as seen in a vertical sectional view, and side wall portions 32B that extend toward the seat upper side from the seat transverse direction both end portions of the lower surface portion 32A. Further, the outer rail 32 has upper flange portions 32C that are bent at right angles toward the inner side of the open cross-section from the upper end portions of the side wall portions 32B, and extend substantially horizontally. The front end portions, the intermediate portions and the rear end portions of the outer rails 32 are fixed to the floor 16 of the vehicle via brackets 34 (see FIG. 6, FIG. 9). Note that the outer rails 32 correspond to the "rail members" of the present disclosure.

Plural ball bearings 36, which are spherical and are disposed along the seat longitudinal direction, are disposed at the interior of the outer rail 32 at the corner portions formed by the lower surface portion 32A and the side wall portions 32B. Shoe members 38 that are made of resin are disposed along the side wall portions 32B and the upper flange portions 32C. When the lower rail 24 is inserted in the inner side of the outer rail 32, the lower rail 24 is supported at the outer rail 32 via the ball bearings 36 and the shoe members 38. Due thereto, friction that arises between the outer rail 32 and the lower rail 24 is reduced, and the slide rail 22 can slide with respect to the outer rail 32.

Figure 7:
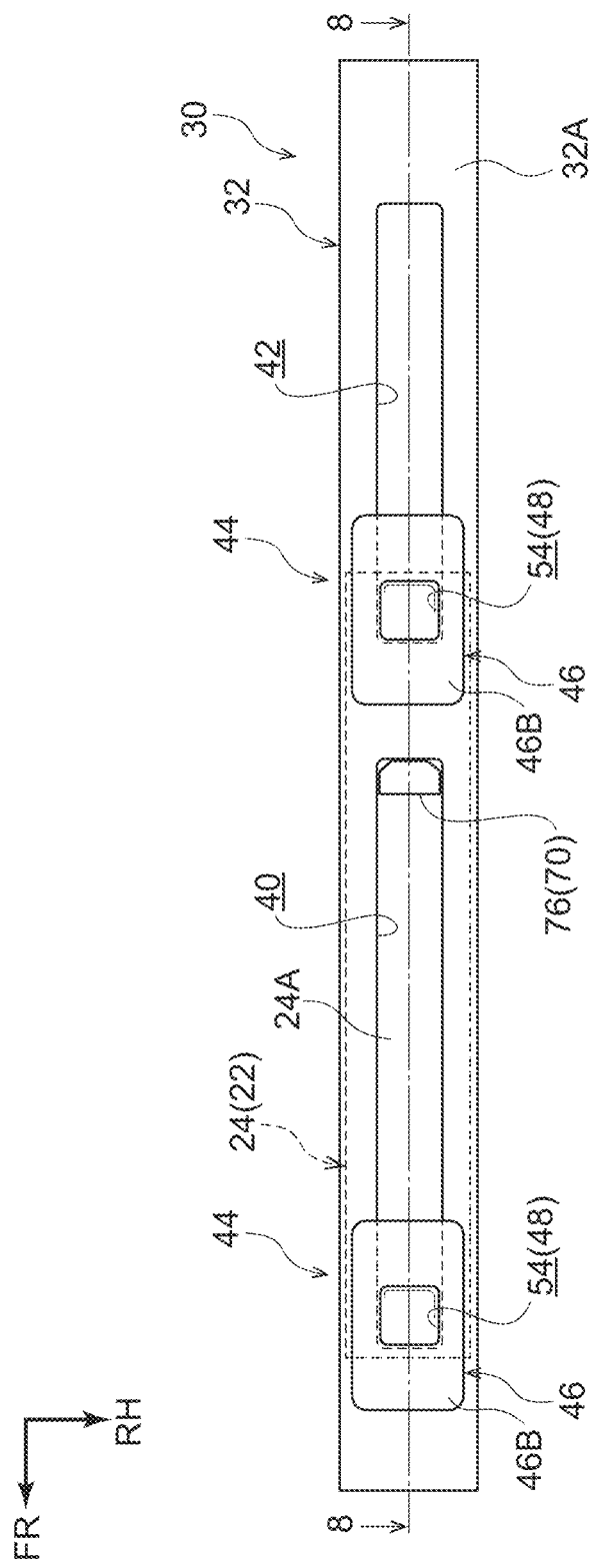
FIG. 7 is a bottom view in which an outer rail and the slide rail that are shown in FIG. 6 are seen from a seat lower side.
Figure 10:
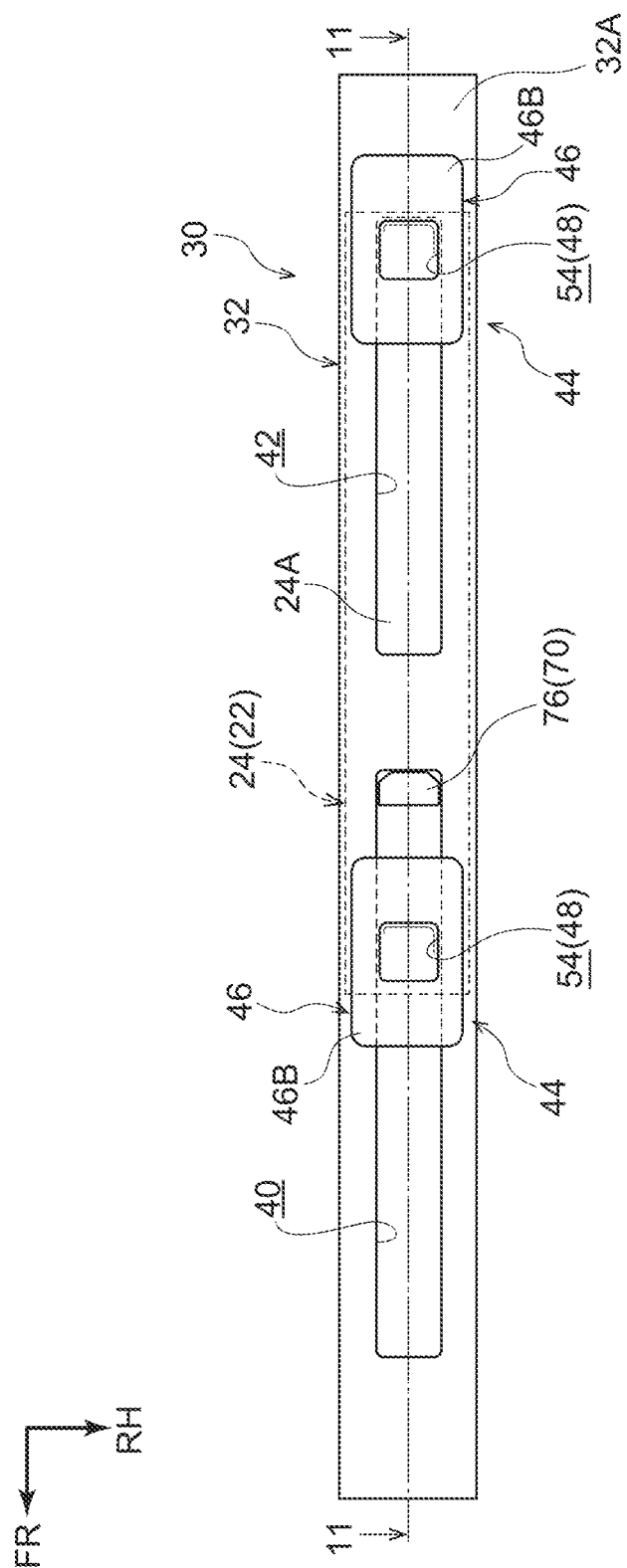
FIG. 10 is a bottom view in which the slide rail shown in FIG. 9 is seen from the seat lower side.

FIG. 7 and FIG. 10 are bottom views that are seen from the seat lower side and that schematically illustrate the outer rail 32 and the slide rail 22. As shown in these drawings, two slits, which pass through the lower surface portion 32A in the plate thickness direction and that extend in the seat longitudinal direction, are formed in the lower surface portion 32A of the outer rail 32. Of these two slits, the slit that is formed at the seat longitudinal direction front portion of the outer rail 32 is a front slit 40, and the slit that is formed at the seat longitudinal direction rear portion of the outer rail 32 is a rear slit portion 42. In the present embodiment, the length dimension, in the seat longitudinal direction, of the front slit 40 is formed so be slightly longer than that of the rear slit portion 42. Note that, in FIG. 7 and FIG. 10, a case portion 72 and an urging member 74 of the locking mechanism 70 are not shown, and a lock piece 76 is illustrated schematically.

(Upward Movement Suppressing Members 44)

As shown in FIG. 2, the upward movement suppressing member 44 is disposed so as to pass through each of the front slit 40 and the rear slit portion 42 from the seat lower side. Namely, a pair of the upward movement suppressing members 44 is disposed at the lower side of the outer rail 32. Due to the upward movement suppressing members 44 being fixed to the lower rail 24 with the outer rail 32 sandwiched therebetween, the upward movement suppressing members 44 can move in the seat longitudinal direction following the lower rail 24. These upward movement suppressing members 44 are also called stabilizers.

To describe the concrete structure thereof, the upward movement suppressing member 44 is formed due to a metal plate being press molded, and is formed in the shape of a rectangular plate as seen in a plan view, and includes a main body portion 46 whose plate thickness direction is the seat vertical direction. The main body portion 46 is disposed so as to face the lower surface portion 32A of the outer rail 32.

A fixing portion 48, which is shaped as a hollow pillar and projects out toward the seat upper side from an upper surface 46A of the main body portion 46, is formed at the main body portion 46. The fixing portion 48 is passed through the corresponding front slit 40 or rear slit portion 42, and the upper surface of the fixing portion 48 abuts the lower surface portion 24A of the lower rail 24. A fastening hole 50 that passes through in the plate thickness direction is formed in the upper surface of the fixing portion 48, and is disposed coaxially with a through-hole 52 that is formed in the lower surface portion 24A of the lower rail 24.

The fixing portion 48 that has the above-described structure is formed by a portion of the lower surface of the main body portion 46 being extruded by press molding, and a concave portion 54 that is formed substantially in the shape of a rectangular pillar is formed in a lower surface 46B of the main body portion 46. A head portion 56A of a bolt 56 is disposed at the interior of the concave portion 54 (the inner side of the fixing portion 48), and a shaft portion 56B is passed through the fastening hole 50 and the through-hole 52, and is screwed together with a weld nut 58 that is welded to the lower rail 24. Due thereto, the upward movement suppressing member 44 is fixed to the lower surface portion 24A of the lower rail 24 via the fixing portion 48. Further, in this state, a gap 59 is formed by the fixing portion 48 between the lower surface portion 32A of the outer rail 32 and the main body portion 46 of the upward movement suppressing member 44. In other words, the fixing portion 48 is a spacer that is interposed between the main body portion 46 and the outer rail 32. At times of usual usage of the vehicle seat 10, the fixing portion 48 suppresses generation of abnormal noise that accompanies the movement of the upward movement suppressing member 44.

Further, as shown in FIG. 1 through FIG. 4, the respective upward movement suppressing members 44 that correspond to the front slits 40 of the pair of left and right outer rails 32 are connected in the seat transverse direction via a cross member 60. As an example, the cross member 60 is formed in the shape of an angular pipe that is flat and extends along the seat transverse direction. Through-holes 62 that pass through in the plate thickness direction are formed in the lower surface of the cross member 60. These through-holes 62 are disposed coaxially with fastening holes 64 that are formed in the seat transverse direction inner end portions of the main body portions 46. Bolts 66 are inserted through the through-holes 62 and the fastening holes 64, and are fastened by being screwed together with weld nuts 68 that are welded to the lower surface of the cross member 60. In this state, the side wall portions 32B (side surfaces), which are at the seat transverse direction inner sides of the outer rails 32, are disposed between the cross member 60 and the bolts 56.

In accordance with the above-described structure, when, due to the impact at the time of a vehicle collision, the slide rails 22 rise up toward the seat upper side, the main body portions 46 of the upward movement suppressing members 44 abut and anchor on the lower surface portions 32A of the outer rails 32. Due thereto, movement of the slide rails 22 toward the seat upper side is restricted.

Further, at the time of a vehicle collision, the cross member, which connects the upward movement suppressing members 44 that are at the seat front side, efficiently transmits load to the left and right upward movement suppressing members 44 via the cross member 60, and the occurrence of unbalanced load is suppressed.

Further, as described above, the fixing portions 48 of the upward movement suppressing members 44, which are disposed at the rear portions of the outer rails 32, are inserted through the rear slit portions 42. Therefore, the upward movement suppressing members 44 can move in the seat longitudinal direction between positions (see FIG. 7), at which the fixing portions 48 anchor on the front ends of the rear slit portions 42, and positions (see FIG. 10), at which the fixing portions 48 anchor on the rear ends of the rear slit portions 42. Further, this movable range is the movable range of the slide rails 22 at the long sliding mechanism 30. Hereinafter, the positions of the slide rails 22 in the state in which the fixing portions 48 are anchored on the front ends of the rear slit portions 42 are called the "forward positions". Further, the positions of the slide rails 22 in the state in which the fixing portions 48 are anchored on the rear ends of the rear slit portions 42 are called the "rearward positions".

(Locking Mechanisms 70)

Figure 5:
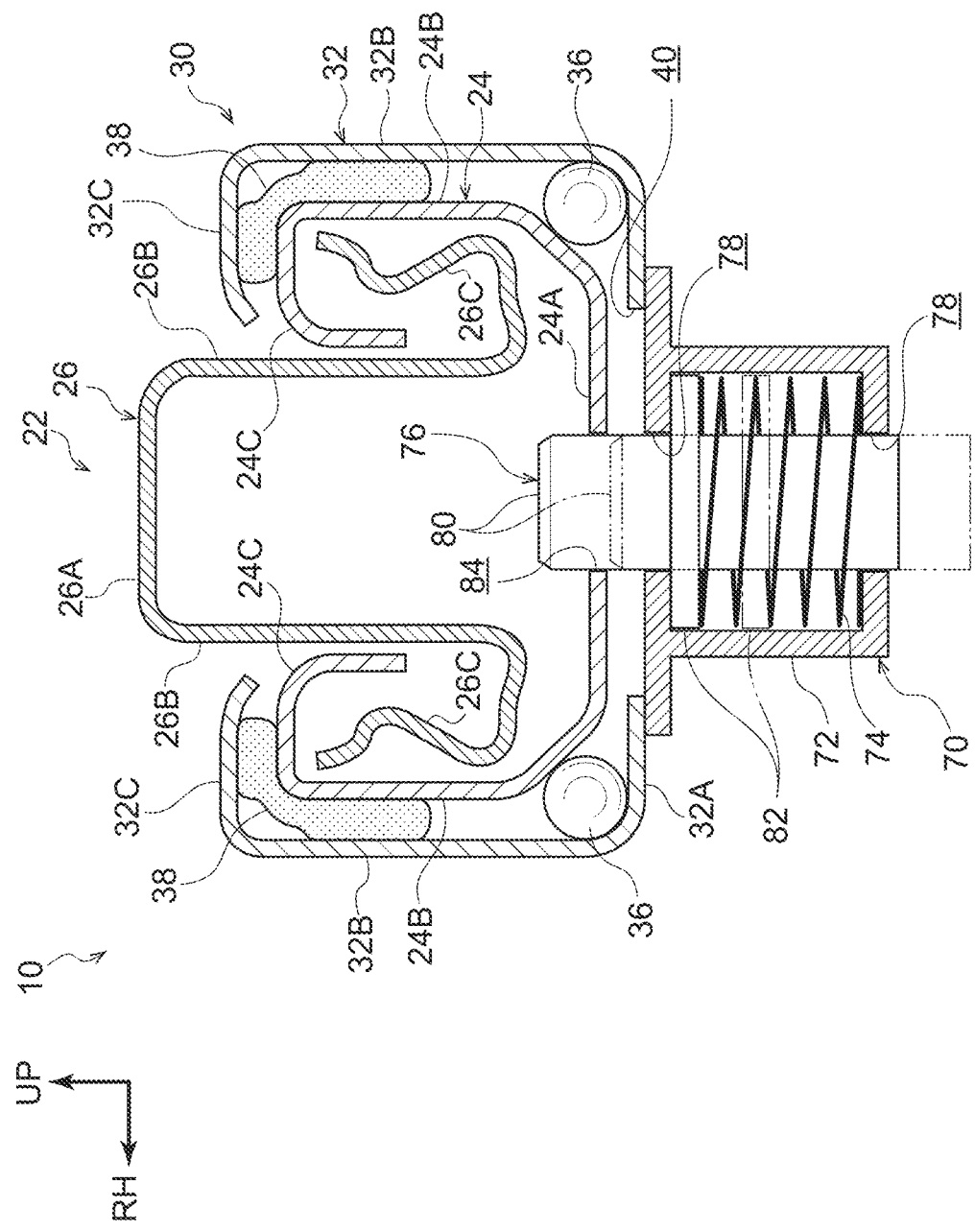
FIG. 5 is an enlarged sectional view showing the cross-section that is cut along line 5-5 of FIG. 3.

As shown in FIG. 3 through FIG. 5, the locking mechanisms 70, which can fix the slide rails 22 at the forward positions or the rearward positions, are disposed at the lower sides of the outer rails 32. The locking mechanism 70 is structured to include the case portion 72 that is box-shaped, the urging member 74 that is accommodated at the interior of the case portion 72, and the lock piece 76 that passes through the case portion 72 in the seat vertical direction and is urged toward the seat upper side by the urging member 74.

As shown in FIG. 3, the case portion 72 is formed in the shape of a rectangular box that is hollow, and is fixed to a position, which overlaps the rear end of the front slit 40, at the lower surface portion 32A of the outer rail 32. Supporting holes 78 that pass through in the seat vertical direction are formed coaxially in the upper surface and the lower surface of the case portion 72, and a main body shaft portion 80 of the lock piece 76 that is described later is supported thereat. The urging member 74 is accommodated at the interior of the case portion 72. The urging member 74 is structured by a torsion coil spring, and is disposed such that the axial direction (the direction of extension and contraction) thereof is the seat vertical direction.

The lock piece 76 has the main body shaft portion 80 that is formed in the shape of a pillar whose axial direction is the seat vertical direction, and a flange portion 82 that is formed at the axial direction intermediate portion of the main body shaft portion 80. The axial direction both end portions of the main body portion 46 are inserted through the supporting holes 78 of the case portion 72 respectively, and the main body portion 46 is disposed so as to pass through the case portion 72 in the seat vertical direction. The flange portion 82 is a plate body that extends in the shape of a flange from the axial direction intermediate portion of the main body shaft portion 80 toward the outer side. As seen in a plan view, the flange portion 82 is larger than the supporting holes, and the flange portion 82 is accommodated at the interior of the case portion 72. Further, the urging member 74 is disposed coaxially at the lower side of the flange portion 82.

As an example, the plunger of an unillustrated solenoid is connected to the lower end portion of the main body shaft portion 80. When energized, the solenoid pulls the plunger in, and the main body shaft portion 80 that is connected to the plunger is moved against the urging force of the urging member 74 to a withdrawn position that is at the seat lower side (the two-dot chain line position in FIG. 5). On the other hand, when the solenoid is not energized, the plunger is released, and the main body shaft portion 80 is moved by the urging force (elastic restoring force) of the urging member 74 toward a projected position that is at the seat upper side (the solid line position in FIG. 5).

Figure 6:
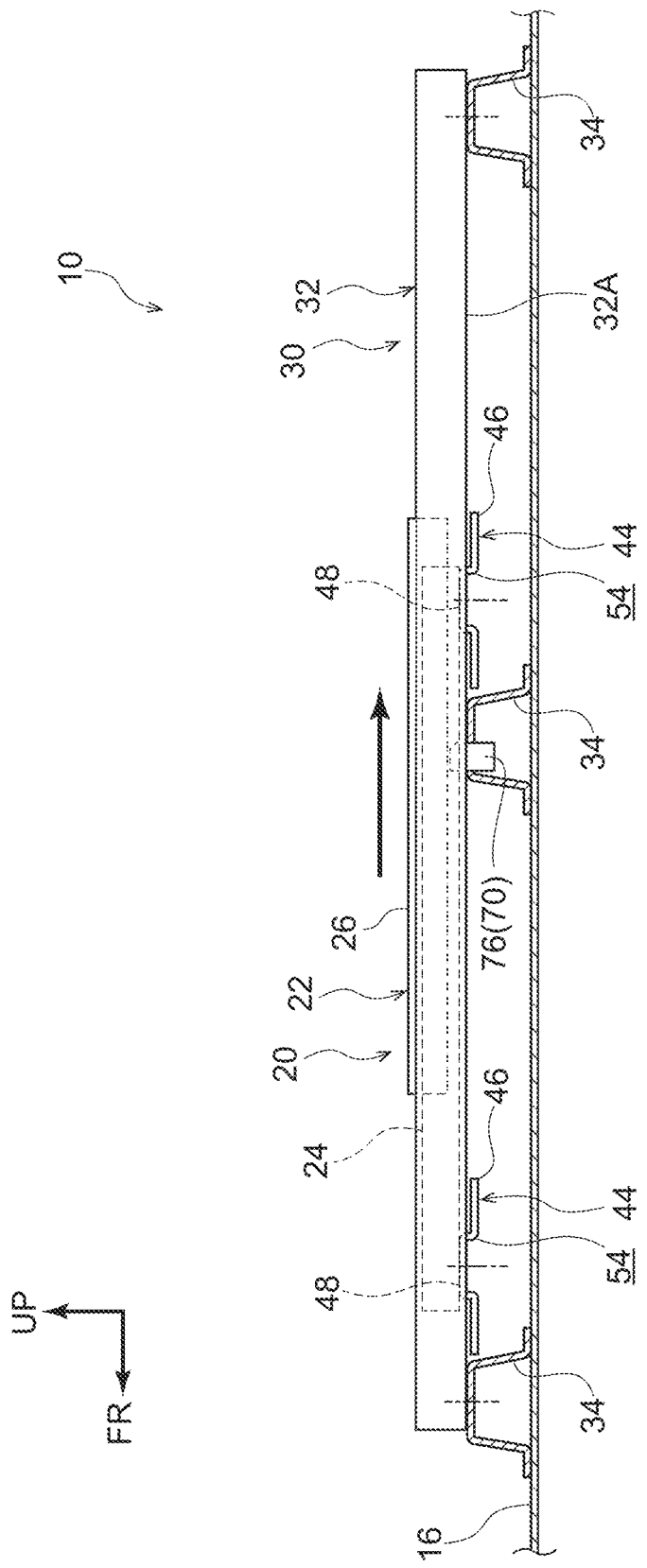
FIG. 6 is a drawing that schematically shows main portions of the first embodiment, and is a side view showing a state in which the slide rail is positioned at the forward position.
Figure 8:
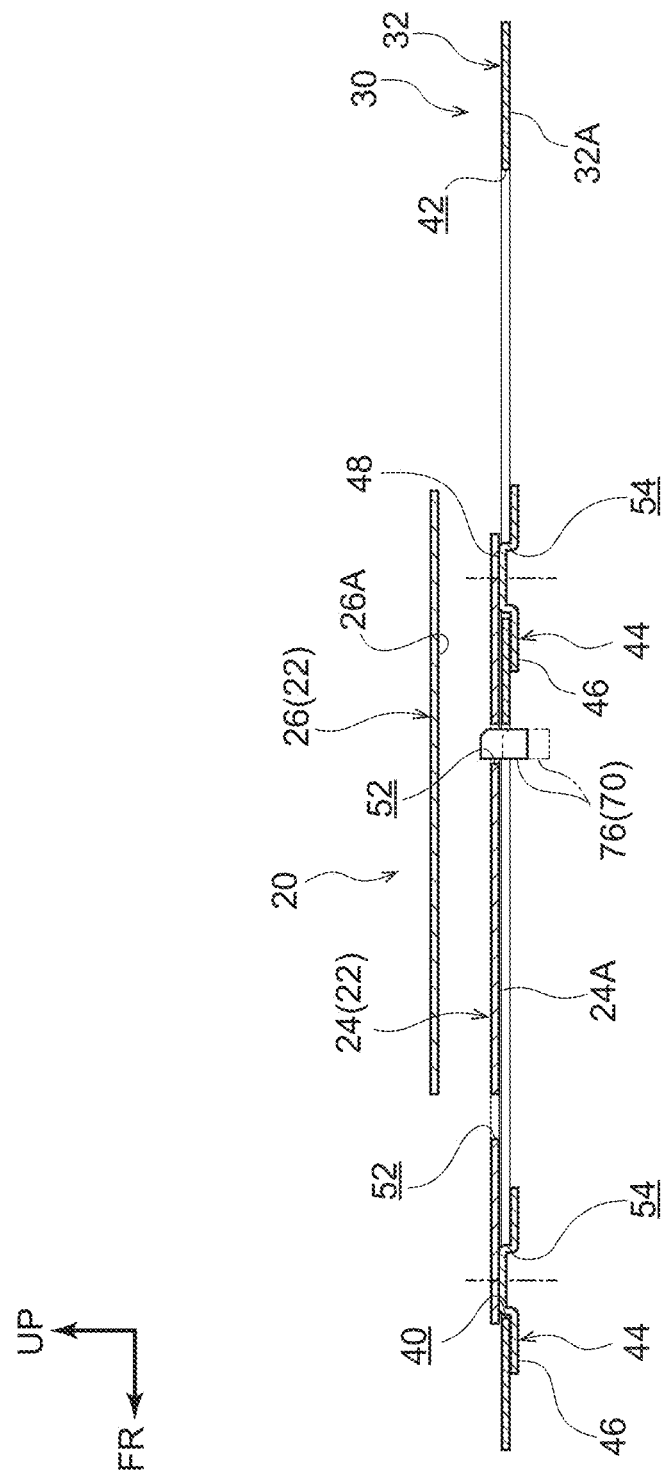
FIG. 8 is a cross-sectional view showing a state that is cut along line 8-8 of FIG. 7.
Figure 9:
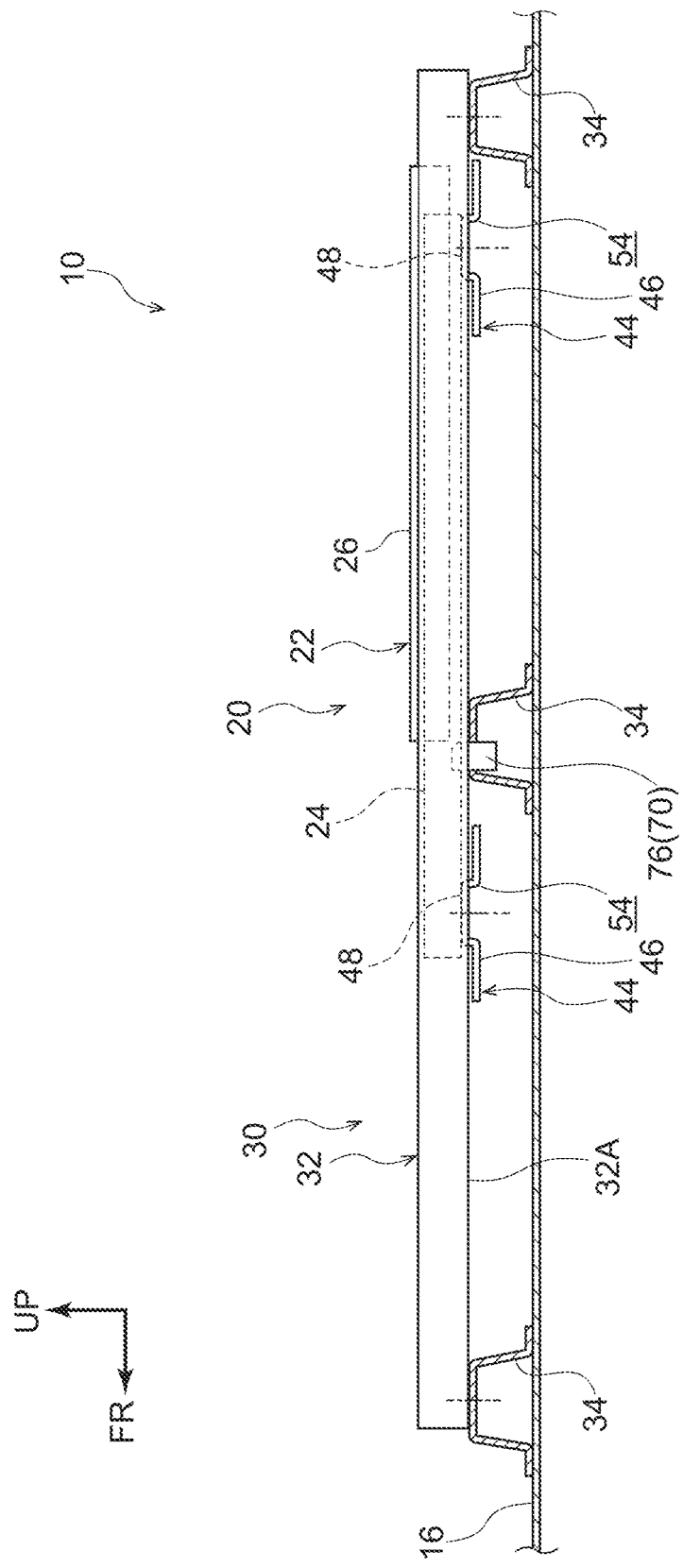
FIG. 9 is a drawing that schematically shows main portions of the present embodiment, and is a side view showing a state in which the slide rail is positioned at the rearward position.
Figure 11:
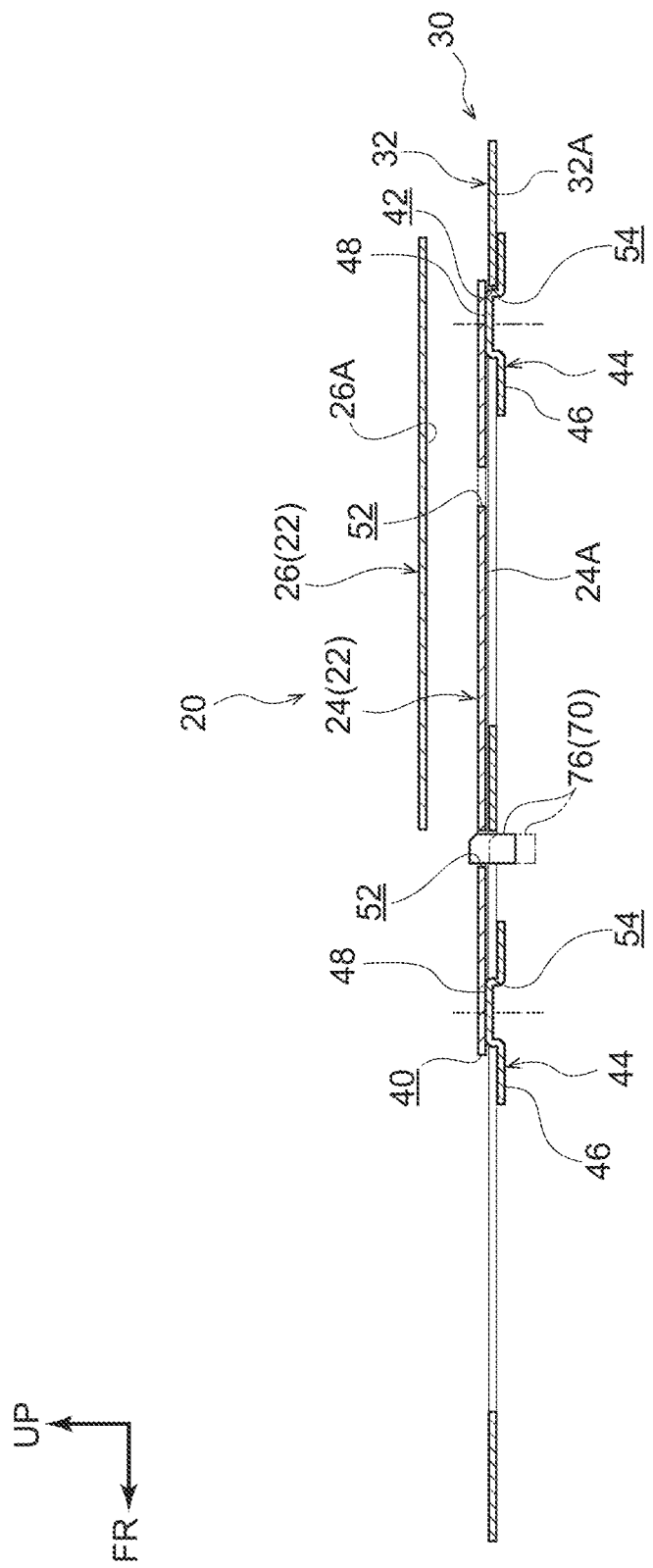
FIG. 11 is a cross-sectional view showing a state that is cut along line 11-11 of FIG. 10.

The forward position of the slide rail 22 is shown schematically in a side view in FIG. 6. FIG. 8 is a cross-sectional view thereof. Further, the rearward position of the slide rail 22 is shown schematically in a side view in FIG. 9, and FIG. 11 is a cross-sectional view thereof. As shown in these drawings, in a case in which the slide rail 22 is positioned at the forward position or the rearward position, a lock hole 84 that is formed in the lower surface portion 24A of the lower rail 24 is disposed at the upper side of the above-described locking mechanism 70. In this state, the solenoid is in a non-energized state, and the main body shaft portion 80 of the lock piece 76 is moved to the projected position. Then, the lock piece 76 is passed through the front slit 40, and is inserted through the lock hole 84 (refer to the solid line position in FIG. 5, FIG. 8 and FIG. 11). Due thereto, the lock piece 76 engages with the lock hole 84, and movement of the lower rail 24 in the seat longitudinal direction with respect to the outer rail 32 is restricted. (Hereinafter, this is called the "locking state" of the lock piece 76.)

On the other hand, at the time when the position of the slide rail 22 is to be moved from the forward position to the rearward position, or from the rearward position to the forward position, the solenoid is set in an energized state, and the main body shaft portion 80 of the lock piece 76 moves to the withdrawn position. The engaged state of the lock piece 76 and the lock hole 84 is cancelled, and the slide rail 22 (the lower rail 24) can slide with respect to the outer rail 32 (the "released state" of the lock piece 76).

(Slide Regulator Module 86)

In the present embodiment, driving force is imparted to the lower rails 24 by the slide regulator module 86. The slide regulator module 86 is structured to include a pair of pulleys 88, a wire 90 that is trained around the pair of pulleys 88, and an electric motor 92 that is a drive source.

Here, the positional relationship between the slide rails 22, the outer rails 32, and the slide regulator module 86 in a case in which the vehicle seat 10 is seen in a plan view is shown schematically in FIG. 3 and FIG. 4. As shown in these drawings, the pair of pulleys 88 are disposed at the lower side of the seat cushion 12 with a predetermined interval therebetween in the seat longitudinal direction. In further detail, as seen in a plan view, the pulleys 88 are disposed at the seat front side and the seat rear side of the cross member 60, respectively. The wire 90 that is formed in an annular shape is trained around the pair of pulleys 88. A wire fixing portion 94 that is provided at an intermediate portion of the wire 90 is fixed to the cross member 60.

The electric motor 92 is connected to a portion of the wire 90, and can drive the wire 90 by rotating forward and reversely. Due to the electric motor 92 operating, the wire 90 moves, and the cross member 60 that is connected to the wire 90 is driven in the seat longitudinal direction along the front slits 40 of the outer rails 32. Due thereto, the slide rails 22 (the lower rails 24) that are connected to the cross member 60 are slid between the forward positions shown by the solid lines in FIG. 3 and the rearward positions shown by the solid lines in FIG. 4.

Note that the slide regulator module 86 of the above-described structure is mounted via unillustrated brackets to the floor 16 of the vehicle or to the outer rails 32.

At the long sliding mechanism 30 that has the above-described structure, the vehicle seat 10 can be set at a reference position (a standard posture position) due to the slide rails 22 being set at the forward positions. Further, the vehicle seat 10 can be set in a relaxed posture position due to the slide rails 22 being set at the rearward positions. Note that the relaxed posture positions are positions at which the vehicle seat 10 is moved greatly further toward the rear side than the standard position, and the distance between the passenger and the dashboard that is at a vehicle front chamber (not illustrated) is sufficiently ensured. In this state, the passenger can tilt the seatback of the vehicle seat 10 greatly toward the seat rear side, and can assume a relaxed posture that is close to a posture of lying down.

Note that, if the seat position at the standard posture position of the vehicle seat 10 is adjusted in advance by the above-described seat position adjusting mechanism 20, at the time when the vehicle seat 10 is returned from the relaxed posture position to the standard posture position, the optimal seat position can be stored (such that operation for adjusting the seat position by the seat position adjusting mechanism 20 again is rendered unnecessary).

(Operation and Effects)

Operation and effects of the present embodiment are described next.

In the vehicle seat 10 relating to the present embodiment, the slide rails 22 that are connected to the seat cushion 12 are slid with respect to the outer rails 32 by the long sliding mechanism 30. When the slide rails 22 slide with respect to the outer rails 32, the upward movement suppressing members 44 that are fixed to the lower surfaces of the slide rails 22 move in the seat longitudinal direction following the slide rails 22.

By the way, when load in vehicle upward direction is inputted to the vehicle seat 10 at the time of a collision of the vehicle, the slide rails 22 that are connected to the seat cushion 12 and the upward movement suppressing members 44 are pulled toward the seat upper side. At this time, the main body portions 46 of the upward movement suppressing members 44 abut and anchor on the lower surface portions 32A of the outer rails 32, and therefore, movement of the slide rails 22 toward the seat upper side is restricted. As a result, it is difficult for the slide rails 22 to become dislocated from the outer rails 32, and upward displacement of the vehicle seat 10 that accompanies a collision is suppressed, and the passenger protecting performance of the vehicle seat 10 can be improved.

Further, in the present embodiment, the fixing portions 48 are spacers, and the gaps 59 are formed between the lower surfaces of the outer rails 32 and the main body portions 46. Therefore, at usual times, when the vehicle seat 10 is moved along the outer rails 32, the generation of abnormal noise that accompanies movement of the upward movement suppressing members 44 is suppressed. Further, the slide rails 22 that are connected to the upward movement suppressing members 44 can slide smoothly with respect to the outer rails 32. Due thereto, the operability of the vehicle seat 10 at usual times improves.

Further, in the present embodiment, a pair of the upward movement suppressing members 44 is connected in the seat transverse direction by the cross member 60 that extends in the seat transverse direction. Therefore, at the time of a collision of the vehicle, load that is inputted to the vehicle seat 10 is transmitted efficiently from the upward movement suppressing members 44 via the cross member 60 to the left and right outer rails 32. As a result, at the time of a collision of the vehicle, the load that is applied to the vehicle seat 10 can be dispersed efficiently, and displacement of the vehicle seat 10 can be suppressed. Further, because the cross member 60 also serves as a frame member of the slide rails 22, the rigidity of the slide rails 22 can be improved.

In the present embodiment, the cross member 60 and the bolts 56 that pass through the fixing portions 48 in the seat vertical direction are disposed such that the side wall portions 32B that are at the seat transverse direction inner sides of the outer rails 32 are located between the cross member 60 and the bolts 56. Therefore, in a case in which load in the seat transverse direction is inputted to the vehicle seat at the time of a collision of the vehicle, the side surfaces at the seat transverse direction inner sides of the outer rails 32 receive reaction force from the bolts 56 or the cross member 60, which are positioned at the left and right both sides, and are supported. Due thereto, deformation of the side wall portions 32B that are at the seat transverse direction inner sides of the outer rails 32 is suppressed, and it is even more difficult for the slide rails 22 to become dislocated from the outer rails 32.

Further, in the present embodiment, due to the lock pieces 76 of the locking mechanisms 70 being engaged with the lock holes 84 of the slide rails 22 (the lower rails 24), the slide rails 22 can be fixed at predetermined positions with respect to the outer rails 32. Concretely, as shown by the solid line positions in FIG. 5, FIG. 8 and FIG. 11, in a case in which the slide rails 22 are positioned at the forward positions or the rearward positions, the lock pieces 76 are in the locking states and can be engaged with the lock holes 84.

Due thereto, when load in the seat longitudinal direction is inputted to the vehicle seat 10 at the time of a vehicle collision, because the lock pieces 76 abut and are anchored on the lock holes 84, movement of the slide rails 22 in the seat longitudinal direction is restricted. As a result, displacement of the vehicle seat 10 in the seat longitudinal direction that accompanies a collision can be suppressed.

Moreover, in the present embodiment, in the state in which the slide rails 22 are positioned at the forward positions or the rearward positions, the fixing portions 48 of the upward movement suppressing members 44 are in states of being anchored on the front ends or the rear ends of the rear slit portions 42 of the outer rails 32. Therefore, when load in the seat longitudinal direction is inputted to the vehicle seat 10 at the time of a collision of the vehicle, the load can be dispersed to the outer rails 32 and the locking mechanisms 70 via the upward movement suppressing members 44 and the lock pieces 76. As a result, displacement of the vehicle seat 10 in the seat longitudinal direction accompanying a collision can be suppressed more effectively.

Further, the vehicle seat 10 of the present embodiment is a structure that includes the two sliding mechanisms that are the seat position adjusting mechanism 20 and the long sliding mechanism 30. The seat position adjusting mechanism 20 and the long sliding mechanism 30 are structured by separate driving mechanisms. Due thereto, the large movement of the seat position that utilizes the long sliding mechanism 30 can be completed rapidly.

In the present embodiment, the fixing portions 48 of the upward movement suppressing members 44 are formed in the shapes of hollow pillars, and the head portions 56A of the bolts 56 are disposed at the inner sides of the fixing portions 48. Therefore, the rigidity of the fixing portions 48 increases, and, at the time of a collision of the vehicle, the efficiency of transmitting load between the fixing portions and the outer rails 32 can be improved.

Second Embodiment

A vehicle seat 100, to which is applied a vehicle seat passenger protection structure relating to a second embodiment, is described hereinafter by using FIG. 12. Note that structural portions that are the same as those of the above-described first embodiment are denoted by the same reference numerals, and description thereof is omitted.

The present embodiment has a feature in the point that the upward movement suppressing members 44 are applied to a seat position adjusting mechanism 102 of the vehicle seat 100 that does not have the long sliding mechanism 30.

Figure 12:
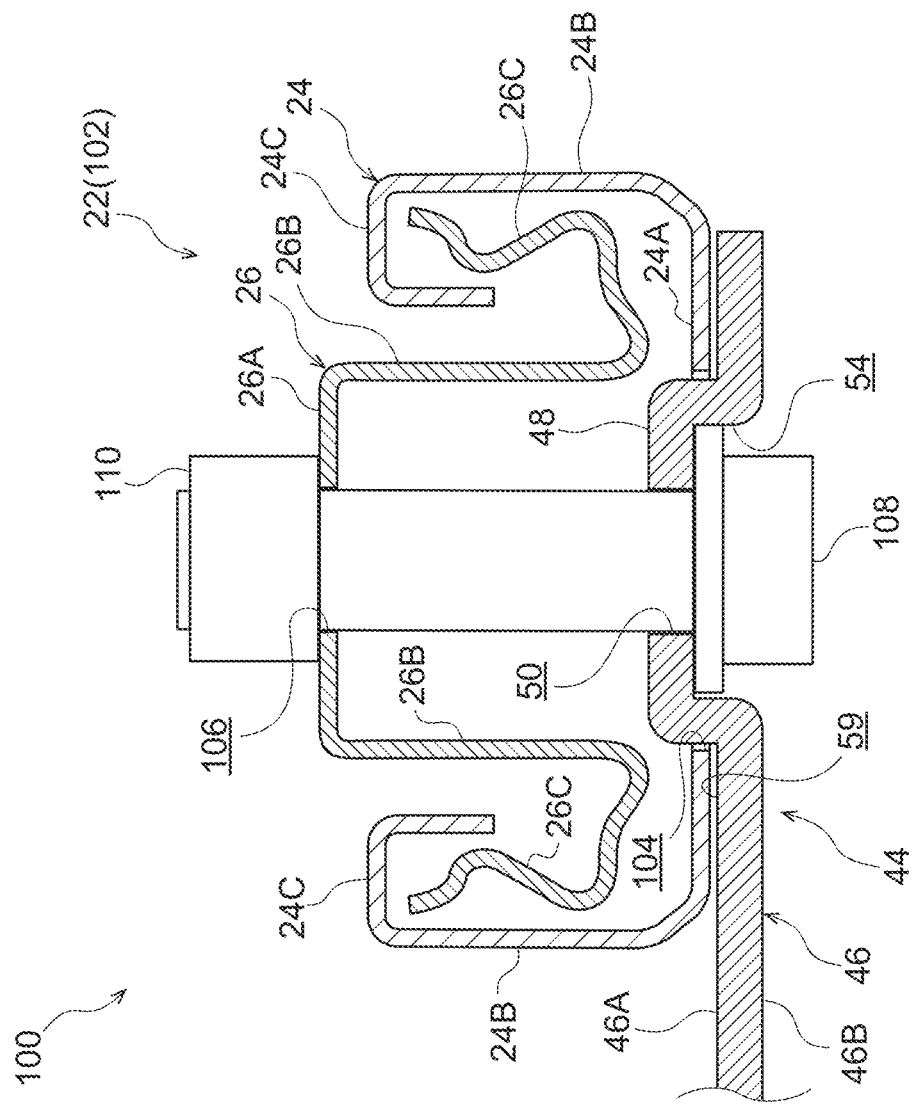
FIG. 12 is an enlarged sectional view that corresponds to FIG. 2 and shows a vehicle seat passenger protection structure relating to a second embodiment.

The front end portion of the slide rail 22 that structures the seat position adjusting mechanism 102 is shown in a vertical sectional view in FIG. 12. As shown in this drawing, the seat position adjusting mechanism 102 is structured to include the pair of left and right slide rails 22 that have the lower rails 24 and the upper rails 26, and the upward movement suppressing members 44 that restrict movement of the upper rails 26 toward the seat upper side. Note that the lower rails 24 correspond to the "rail members" of the present disclosure, and the upper rails 26 corresponds to the "sliding members" of the present disclosure.

In the present embodiment, a slit portion 104, which passes through the lower surface portion 24A of the lower rail 24 in the plate thickness direction and extends in the seat longitudinal direction, is formed in the lower surface portion 24A. The fixing portion 48 of the upward movement suppressing member 44 passes through and is disposed in this slit portion 104. The main body portion 46 of the upward movement suppressing member 44 is disposed so as to face the lower surface portion 24A of the lower rail 24.

Further, a through-hole 106, which passes through the upper surface portion 26A in the plate thickness direction, is formed at the upper surface portion 26A, which is positioned at the front end portion of the upper rail 26, and is disposed coaxially with the fastening hole 50 that is formed in the upper surface of the fixing portion 48. A bolt 108 is inserted through the fastening hole 50 and the through-hole 106 from the seat lower side of the upward movement suppressing member 44, and is fastened by being screwed together with a weld nut 110. Due thereto, the upward movement suppressing member 44 is fixed to the upper rail 26 via the fixing portion 48. When the upper rail 26 slides with respect to the lower rail 24, the upward movement suppressing member 44 can move in the seat longitudinal direction following the upper rail 26.

(Operation/Effects)

In accordance with the above-described structure, when load in the seat upward direction is inputted to the vehicle seat 100 at the time of a vehicle collision, the upper rails 26 that are connected to the seat cushion 12 and the upward movement suppressing members 44 are pulled toward the seat upper side. At this time, the main body portions 46 of the upward movement suppressing members 44 abut and are anchored on the lower surface portions 24A of the lower rails 24, and therefore, movement of the upper rails 26 toward the seat upper side is restricted. As a result, it is difficult for the upper rails 26 to become dislocated from the lower rails 24, and upward displacement of the vehicle seat 100 that accompanies a collision can be effectively suppressed, and the passenger protecting performance of the vehicle 100 can be improved.

Further, because the present embodiment can be applied to lower rails and upper rails that are included in known seat position adjusting mechanisms, the economy and versatility are excellent.

(Modified Example)

In the present embodiment, as in the modified example shown in FIG. 13, the upward movement suppressing member 44 can be fixed to the upper rail 26. In this modified example, two fastening holes 114 that are lined up in the seat transverse direction are formed in the upper surface of the fixing portion 48 of the upward movement suppressing member 44. On the other hand, at the upper rail 26, through-holes 116 are formed in the pair of folded-over portions 26C of the upper rail 26 respectively, so as to be disposed coaxially with the fastening holes 114. A pair of bolts 118 are inserted through the fastening holes 114 and the through-holes 116 from the seat lower side of the upward movement suppressing member 44, and are fastened by being screwed together with a pair of weld nuts 120.

In accordance with the above-described structure, because the distal ends of the bolts 118 and the weld nuts 120 are not disposed at the upper surface portions 26A of the upper rails 26, interference of the fastening portions with the seat cushion and the like, which are disposed at the upper sides of the slide rails 22, can be avoided.

[Supplementary Explanation]

In the above-described first embodiment, the vehicle seat 10 is made to be a front passenger's seat. However, the present invention is not limited to this, and the vehicle seat may be, for example, the driver's seat or a rear seat.

Although the above-described first embodiment is structured such that the lock pieces 76 pass through the front slits 40 of the outer rails 32 and engage with the lower rails 24, the present invention is not limited to this. There may be a structure in which opening portions are formed at the rear sides of the front slits 40 in the lower surface portions 32A of the outer rails 32, and the lock pieces 76 pass through the opening portions and engage with the lower rails 24. In this case, because there is no need to make the dimensions of the front slits 40 correspond to the locking mechanisms 70, the front slits 40 and the rear slit portions 42 can be made to be the same dimensions. Due to this, there can be a structure in which, at the time when the slide rails 22 are positioned at the forward positions or the rearward positions, the fixing portions of the corresponding upward movement suppressing members 44 are anchored on the front ends or the rear ends of the respective slit portions.

Further, in the above-described first embodiment, the case portions 72 of the locking mechanisms 70 are fixed to the lower surface portions 32A of the outer rails 32. However, the present invention is not limited to this, and the case portions may be fixed to the floor of the vehicle body via brackets or the like.

Although the above-described first embodiment is structured such that solenoids are connected to the lower end portions of the lock pieces 76, the present invention is not limited to this. For example, there may be a structure in which wires are connected to the lower end portions of the main body shaft portions 80 of the lock pieces 76, and one ends of the wires are connected to a manual operation lever via links. Namely, when the operation lever is pulled, the main body shaft portions 80 are moved to withdrawn positions at the seat lower side against the urging forces of the urging members 74, and the lock pieces 76 can be manually set in the released states. On the other hand, when the slide rails 22 move to the forward positions or the rearward positions, the main body shaft portions 80 are raised in accordance with the urging forces of the urging members, and the lock pieces 76 are set in the locking states.

Further, the above-described second embodiment is a structure that is not provided with the cross member 60 and the locking mechanisms 70 relating to the first embodiment. However, the present invention is not limited to this, and the left and right upward movement suppressing members 44 may be connected by a cross member, and/or the locking mechanisms 70 may be provided at the lower sides of the lower rails 24.

What is claimed is:

1. A vehicle seat passenger protection structure, comprising:
   rail members that are fixed to a floor of a vehicle, that extend in a seat longitudinal direction, that are formed in an open cross-sectional shape opening toward a seat upper side as seen in a vertical sectional view, and that have lower surfaces at which a slit portion extends in the seat longitudinal direction;
   sliding members that are connected to a lower portion of a seat cushion, that are disposed at interiors of the rail members, and that are supported by the rail members so as to be slidable in the seat longitudinal direction; and
   upward movement suppression members that include main body portions, which are disposed so as to face lower surfaces of the rail members, and include fixing portions, which protrude toward the seat upper side from the main body portions, pass through the slit portions and are fixed to lower surfaces of the sliding members, the upward movement suppression members being movable in the seat longitudinal direction following the sliding members.

2. The vehicle seat passenger protection structure of claim 1, wherein the upward movement suppression members are configured such that gaps are formed between the main body portions and the lower surfaces of the rail members, due to the fixing portions serving as spacers.

3. The vehicle seat passenger protection structure of claim 1, wherein:
   locking mechanisms, which have lock pieces that can be displaced in a seat vertical direction, are provided at seat lower sides of the rail members, and
   due to the sliding members being moved to predetermined positions with respect to the rail members, the lock pieces are moved toward the seat upper side, are set in a locking state in which the lock pieces are engaged with lock holes formed in lower surfaces of the sliding members, and restrict movement of the sliding members in the seat longitudinal direction.

4. The vehicle seat passenger protection structure of claim 3, wherein:
   the sliding members are slidable in the seat longitudinal direction between forward positions at which the fixing portions of the upward movement suppression members are anchored to front ends of the slit portions, and rearward positions, at which the fixing portions of the upward movement suppression members are anchored to rear ends of the slit portions, and
   due to the sliding members being moved to the forward positions or the rearward positions, the lock pieces of the locking mechanisms are set in the locking state.

5. The vehicle seat passenger protection structure of claim 1, wherein the fixing portions are formed in a shape of a hollow pillar that protrudes toward the seat upper side from the main body portions, and head portions of bolts, which pass through the fixing portions and fix the fixing portions to the lower surfaces of the sliding members, are disposed in interiors of the fixing portions.

6. The vehicle seat passenger protection structure of claim 1, wherein:
   the sliding members include lower rails and upper rails that are configured integrally,
   the rail members comprise outer rails that support the sliding members, which include the lower rails and the upper rails, such that the sliding members are slidable in the seat longitudinal direction,
   the lower rails extend in the seat longitudinal direction, are disposed at interiors of the outer rails, and are supported by the outer rails so as to be slidable in the seat longitudinal direction, and
   the upper rails are disposed at seat upper sides of the lower rails, are connected to the lower portion of the seat cushion, and are supported by the lower rails so as to be slidable in the seat longitudinal direction.

7. The vehicle seat passenger protection structure of claim 1, wherein:
   the rail members comprise lower rails that are fixed to the floor of the vehicle, that extend in the seat longitudinal direction, that are formed in open cross-sectional shapes that open toward the seat upper side as seen in a vertical sectional view, and that have, at lower surfaces thereof, the slit portion that extends in the seat longitudinal direction, and
   the sliding members comprise upper rails that are connected to the lower portion of the seat cushion, that are disposed at an interior of the lower rails, and that are supported by the lower rails so as to be slidable in the seat longitudinal direction.

* * * * *